(12) United States Patent
Vargas et al.

(10) Patent No.: US 9,028,240 B2
(45) Date of Patent: May 12, 2015

(54) MOLD SET, COMPRESSIVE DEVICE AND DUMPLING FORMING MACHINE

(75) Inventors: Gregory C. Vargas, St. Louis Park, MN (US); Christopher J. Field, Greenwood, MN (US); Michael P. Waldherr, Brooklyn Park, MN (US); Muan Zhu, Nanjing (CN); Edward Lee, Shanghai (CN); Derong Wang, Nanjing (CN); Shuiyuan Liang, Shanghai (CN)

(73) Assignee: General Mills, Inc., Minneapolis, MN (US)

( * ) Notice: Subject to any disclaimer, the term of this patent is extended or adjusted under 35 U.S.C. 154(b) by 259 days.

(21) Appl. No.: 13/699,024

(22) PCT Filed: May 12, 2011
(Under 37 CFR 1.47)

(86) PCT No.: PCT/US2011/036224
§ 371 (c)(1),
(2), (4) Date: Jul. 1, 2013

(87) PCT Pub. No.: WO2011/146314
PCT Pub. Date: Nov. 24, 2011

(65) Prior Publication Data
US 2014/0106018 A1    Apr. 17, 2014

(30) Foreign Application Priority Data

May 21, 2010    (CN) .......................... 2010 1 0188004

(51) Int. Cl.
| A21C 9/08 | (2006.01) |
| A21C 11/06 | (2006.01) |
| A21C 11/00 | (2006.01) |
| A21C 9/06 | (2006.01) |

(52) U.S. Cl.
CPC ............... *A21C 11/008* (2013.01); *A21C 9/088* (2013.01); *A21C 9/063* (2013.01)

(58) Field of Classification Search
CPC ....... A21C 9/063; A21C 9/088; A21C 11/008
USPC .............. 425/324.1, 363, 374, 385, 397, 112, 425/500; 99/450.1–450.7, 352, 353, 494; 426/502
See application file for complete search history.

(56) References Cited

U.S. PATENT DOCUMENTS

| 3,756,231 | A | * | 9/1973 | Ross .............................. 100/232 |
| 4,160,634 | A |   | 7/1979 | Huang |
| 4,448,576 | A |   | 5/1984 | Liu |
| 4,580,436 | A |   | 4/1986 | Nelson |
| 4,591,328 | A | * | 5/1986 | Cheung ........................ 425/385 |
| 4,597,731 | A |   | 7/1986 | Suzuki |
| 4,944,596 | A |   | 7/1990 | DeChristopher |
| 5,161,458 | A | * | 11/1992 | Cheung ....................... 99/450.6 |
| 5,225,216 | A |   | 7/1993 | Barracchini et al. |
| 2003/0203086 | A1 |  | 10/2003 | Twerdok |
| 2005/0226093 | A1 |  | 10/2005 | Yada et al. |

* cited by examiner

*Primary Examiner* — Joseph S Del Sole
*Assistant Examiner* — Thu Khanh T Nguyen
(74) *Attorney, Agent, or Firm* — Paul J. LaVanway, Jr.; John L. Crimmins

(57) ABSTRACT

The present utility model provides a mold set used for dumpling or dumpling-like food product formation comprising a pair of jaws, the closure of which is configured to clamp a dough pad over a filling thereby forming a raw product of the dumpling or dumpling-like food product, wherein the jaws in a closed condition can be driven to simulate the human action of compressing a filling pocket of the dumpling or dumpling-like food product.

11 Claims, 6 Drawing Sheets

MOLD SET, COMPRESSIVE DEVICE AND DUMPLING FORMING MACHINE

This application is a U.S. National Stage of International Application Serial No.: PCT/US2011/036224, fled May 12, 2011, whish claims priority to Chinese Patent Application Serial No. 201010188004.9, filed May 21, 2010, the entire disclosure of which is incorporated herein by reference.

TECHNICAL FIELD

The present invention relates to a mold set for dumpling or dumpling-like food product formation, a compressive device used to compress the mold set, and a dumpling forming machine equipped with the mold set ad the compressive device.

BACKGROUND

To improve productivity, food manufacturers nowadays always use forming machines to help form dumplings. In most cases, dumpling forming machines presently used are configured to form dumplings in sequential steps as below: first, dough or a mixture of flour and water are sheeted through one or more rolling mills, which then turn out a dough sheet of desirable quality and thickness; next, die cutters of predetermined geometric sections, such as round or elliptic, are driven to cut through the dough sheet from which dough pads of corresponding shapes are cut out and then dropped flat an a corresponding number of forming fixtures placed under the cutters, respectively; finally, the dough pads, each conveyed on a mold set thereby to receive a filling in the next step, will be folded over the filling in a closing action of each forming fixture such that a dumpling is first formed in the shape of a "D" or a semicircle (hereinafter referred to as the "D-shape or semicircular raw product" of a dumpling). The whole process as above has also been described in the Chinese patent application No. 200910168437.7 entitled "Dumpling Forming Method and Device" which was filed by the applicant of the present invention on Aug. 20, 2009.

In the process that follows, a manual process is needed to finally shape the D-shape or semicircular raw products into the desirable shapes typical of a handmade dumpling. Usually, hand shaping of a dumpling follows the method described as below: pinching as much as possible the whole arcuate ridge (hereinafter referred to as the "crest") of the raw product of a dumpling between the thumb and index finger of each hand, a worker compresses the dumpling filling pocket (hereinafter also referred to as the "filling pocket" or the "pocket") with both-hand palm-side surfaces of the pinching fingers as well as a portion of each palm by oppositely closing both of his wrists. After such compression, the final dumpling product will be shaped to be a real handmade dumpling, typically like a scallop or curved triangle rather than the "D" or semicircular shape of the raw product. Furthermore, the filling pocket, after such compression, is contracted to be tight and juicy, more satiable to people's taste and appetite. It is understandable that diversity in shapes still exist due the more particular manners of compression respective to individual workers. However, filling pocket compression in such manner as described above remains common to all handmade dumplings.

In the prior art, however, the above process of compression still have to be manually realized by human workers and no machine has been developed to date which can take human roles in the final forming of any handmade dumplings. Statistics has shown that, presently, an average of 5 to 6 specialized workers are needed to keep up (cooperate) with a forming machine for continuous production, which has posed a great limit to further improvement in productivity of the industry.

SUMMARY

To reach a final purpose of full automation in dumpling or dumpling-like food product formation, the present invention provides a mold act comprising a pair of jaws, the closure of which is configured to clamp a dough pad over a filling thereby forming a raw product of a dumpling or dumpling-like food product, wherein the jaws, in a state of being closed, can be driven to simulate the human action of compressing the filling pocket of a dumpling or dumpling-like food product from the crest inwardly within a plane defined by the jaws. After such compression, the raw product of a dumpling or dumpling-like food product will change from the shape of a "D" or a semicircle to be like a real handmade one, and the filling in the pocket will be tight and juicy, more satiable to people's taste and preference. The mold set will apply to finally replace the human role in traditional dumpling or dumpling-like food production, resulting in a great increase in productivity as well as a much lower cost in labor cost.

The present invention also provides a compressive device for driving the jaws of the mold set in a state of being closed to simulate the human action of compressing from the crest inwardly the filling pocket of a dumpling or dumpling-like food product within a plane defined by the jaws.

The present invention further provides a dumpling forming machine comprising at least one of the mold set ad a corresponding number of compressive devices as described above.

Purposes, characteristics and advantages of the invention will be more obvious from the following description with references to the accompanying drawings to be described as below.

DETAILED DESCRIPTION

First, it should be noted that, in the invention described herein, the terms "dough" or "mixture of flour and water" mean a soft, thick mixture of dry ingredients, such as flour or meal, and liquids, such as water, milk and/or oil, that is kneaded, shaped, and cooked, in order to provide a raw material for a food product, especially as raw material for dumplings or dumpling-like food products.

Also, terms like "dumpling(s)" or "dumpling-like food products" as used herein not only indicate the traditional food of Chinese dumplings but also include other dumpling-like food products such as Japanese dumplings, pierogi, ravioli, etc. Generally speaking, any machine or process aimed at replacing the human role or imitating human actions in dumpling or dumpling-like food product formation belongs to the scope for which protection is sought in the present invention, as long as a movable mold set member is used to simulate the human action in compressing the filling pocket of a dumpling or dumpling-like food product.

For a purpose of easy description, opposite margins of a dough pad that are pinched together and thereby stick to each other so as to form an arcuate ridge will be called herein as a "crest" in either of the raw or final product of a dumpling or dumpling-like food product. Also, the bulging part of a dumpling or dumpling-like food product that holds a filling therein will be called as a "pocket" or "filling pocket" in the description herein. Therefore, a dumpling, either in the form of a law or final product, will comprise the central bulging filling pocket and the peripheral arcuate crest bordering the pocket.

It is understandable that, in the description herein, directions in terms of "front", "rear", "left", "right", "upper", and "lower" are used only to indicate a particular orientation in which subject matters of the present invention are located with respect to a chosen system of reference as shown in the accompanying drawings. Therefore, the directions as referenced above with respect to that particular system are only used for the purpose of easy description rather than inappropriately limiting the invention. In other words, any understanding of the invention should not be restricted by the particular frame of reference chosen for the purpose of easy description.

Figure 2:
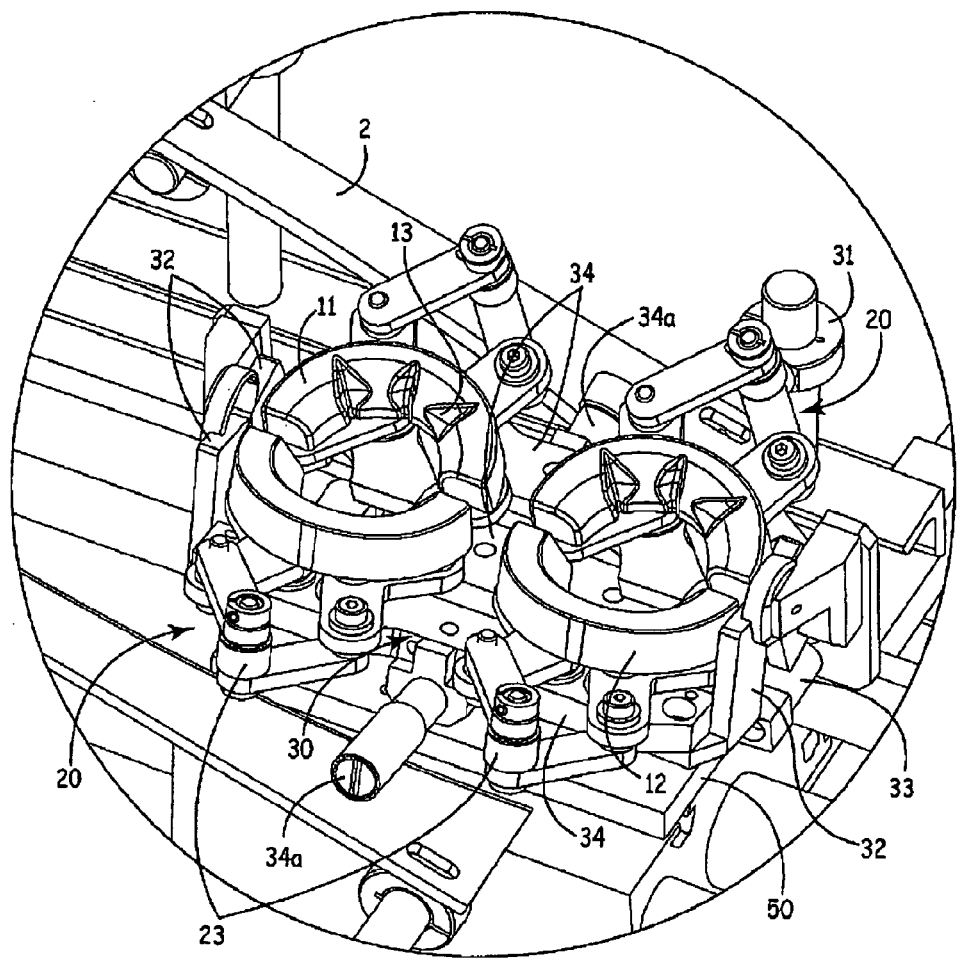
FIG. 2 is an amplified diagram of the zone "A" in FIG. 1, in which forming pallet 100 of the present invention is shown in a large scale.
Figure 3:
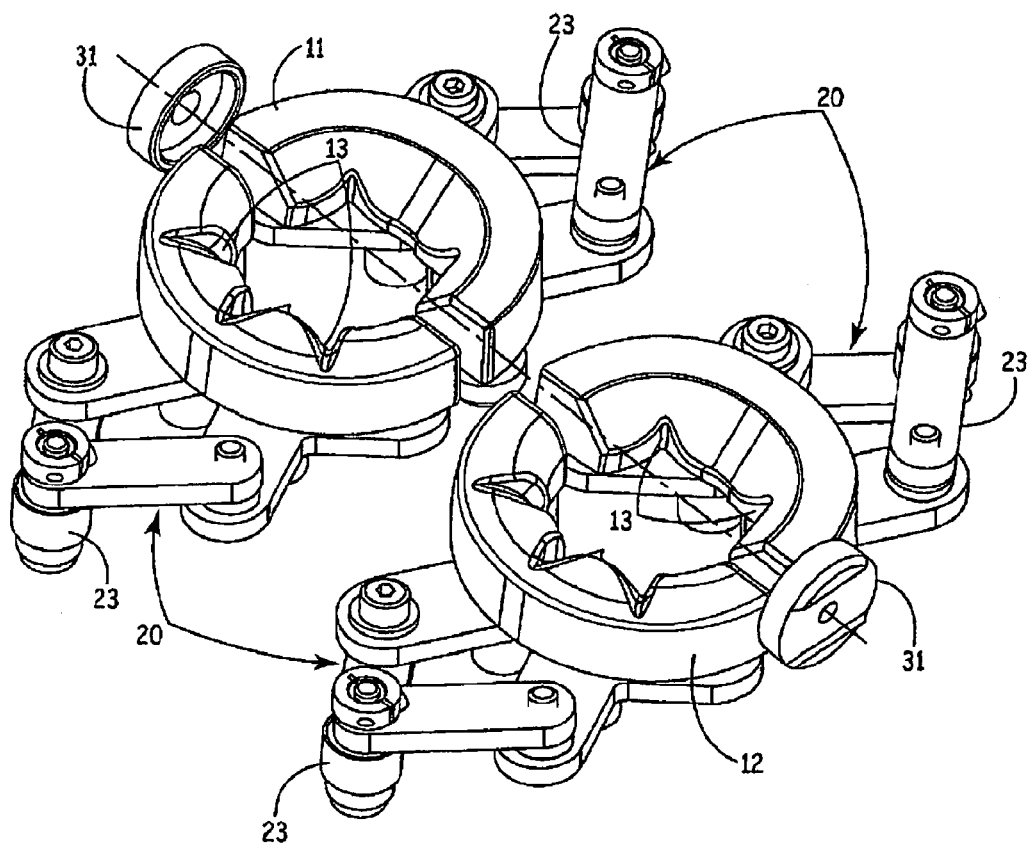
FIG. 3 is a perspective view showing two of the mold sets according to the present invention in the forming pallet as well as the transmission mechanisms each for driving a jaw in each of the mold sets.
Figure 4:
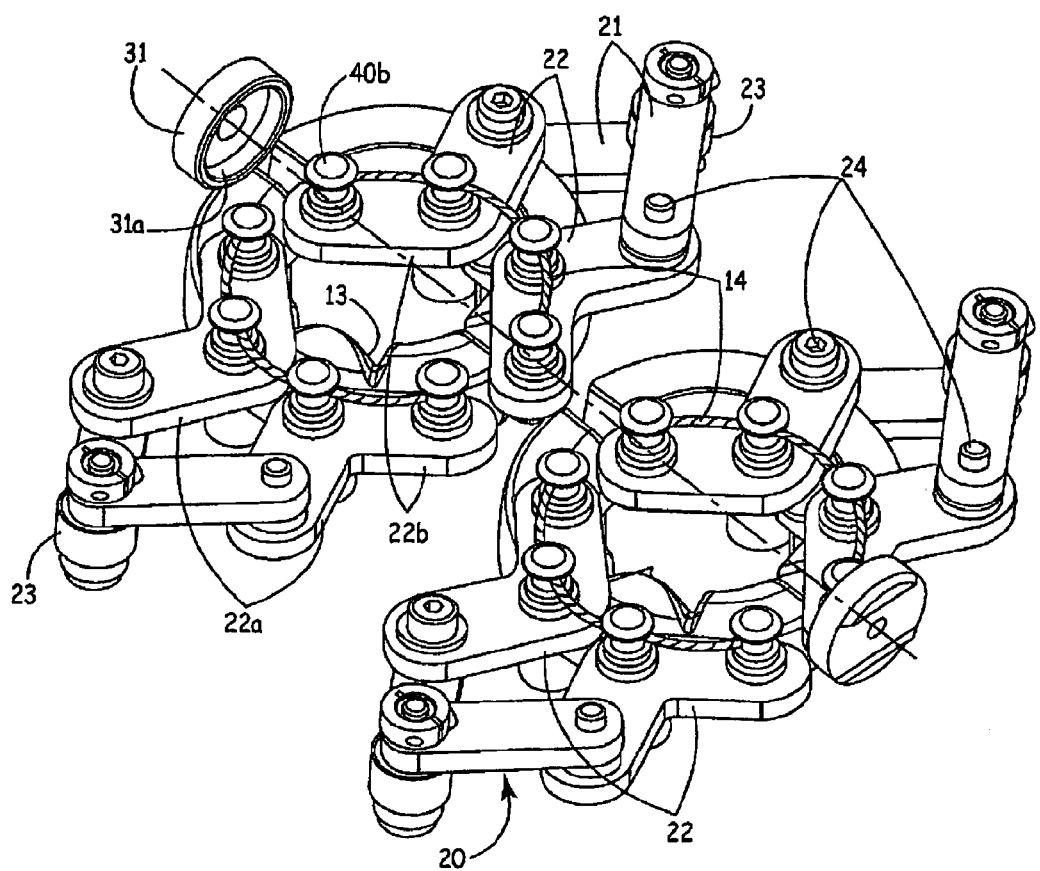
FIG. 4 is a transparent perspective view showing the four-bar linkages of the present invention and the connectors attached thereon for connections.

In the embodiment as shown in FIGS. 2-4, forming pallet 100 comprises, from the top down, at least one mold set 10, a corresponding number of transmission mechanisms 20, an underpan 30, and a base frame 50. Each mold set 10 includes a pair of jaws 11 and 12 sharing symmetrical shapes therebetween. When the pair of jaws 11 and 12 lie flat, mold set 10 will open up, the outline of which then corresponds to that of a dough pad. As regular dough pads are round or elliptic, the profile of mold act 10, at least in the current embodiment, each appears to be round or elliptic if wide open. Of course, mold set 10 can be designed to have other forms, e.g., in rhombi or rectangles, if need be. Forming pallet 100 can also include only one or more than two of the mold set.

Figure 5:
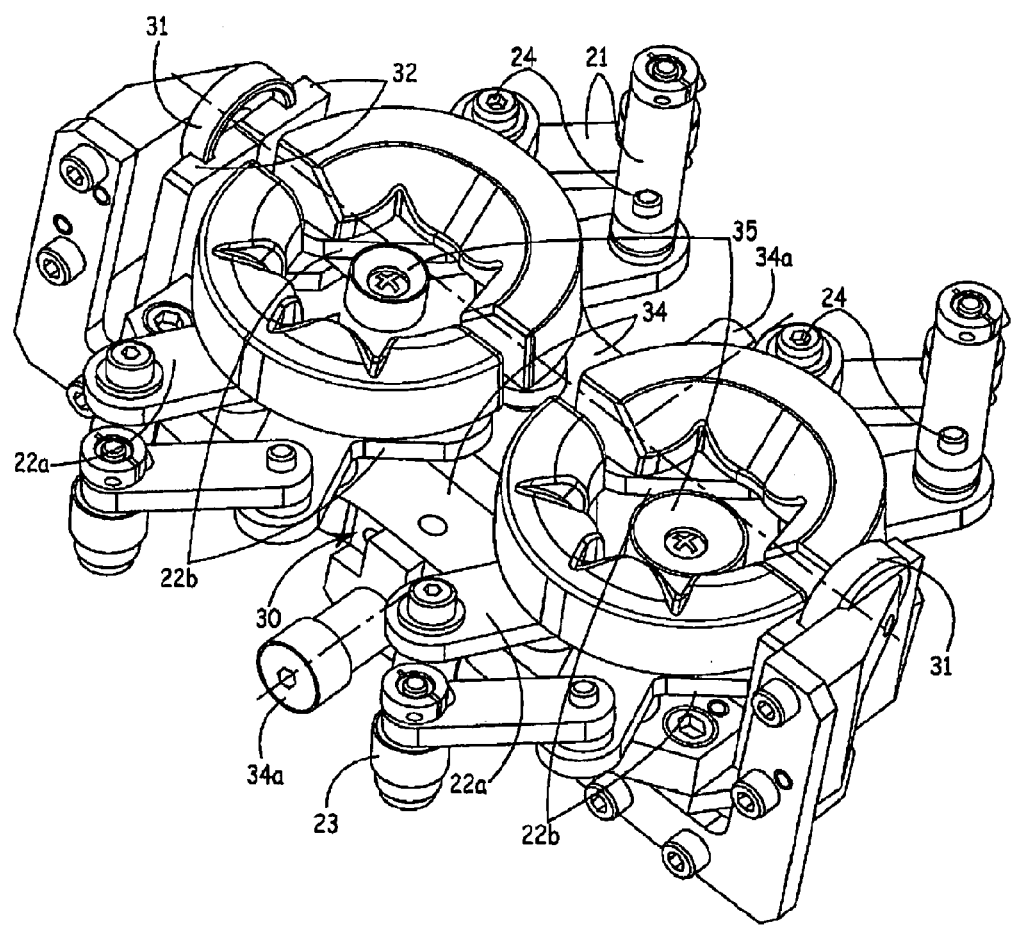
FIG. 5 shows the whole forming pallet of the present invention.
Figure 6:
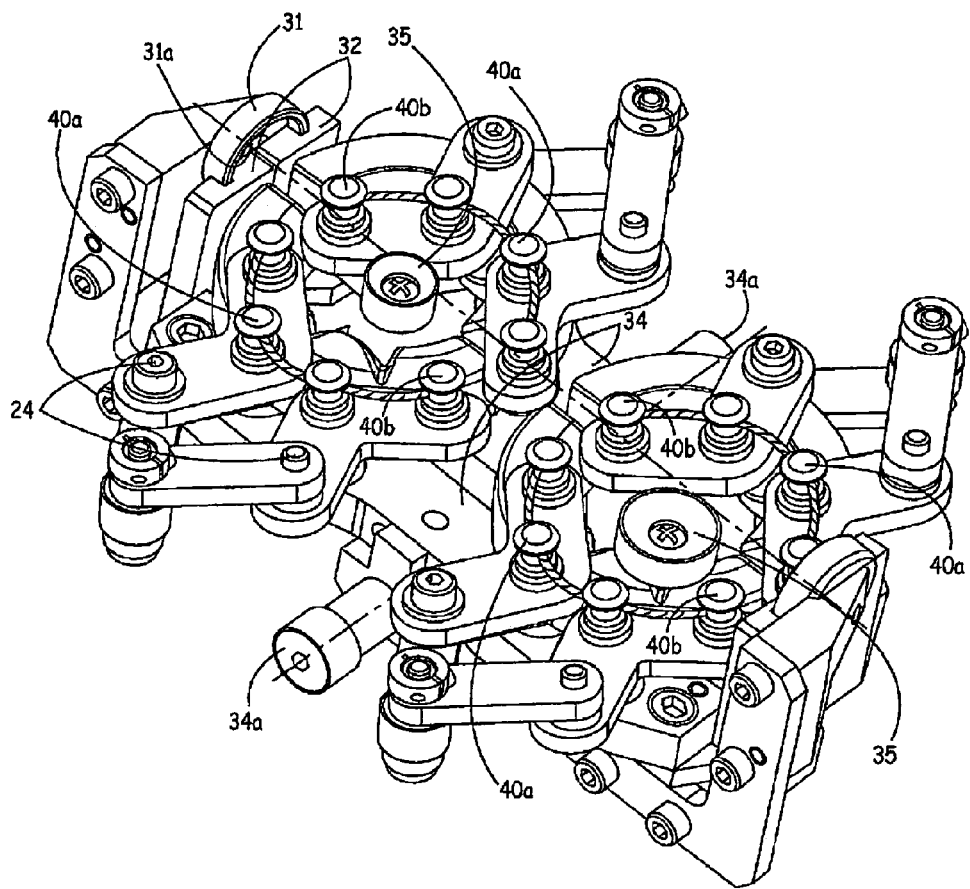
FIG. 6 is a perspective view of the whole forming pallet in which the four-bar linkages are transparency shown with the connectors attached thereon.

Referring to FIGS. 5 and 6, besides jaws 11 and 12, each mold set 10 further includes a saucer 35 configured to be used with jaws 11 and 12 to collectively receive a dough pad cut out from a dough sheet by one of the die cutters. With forming pellet 100 being guided along a predetermined path or otherwise sequentially positioned at different positions in the forming process, jaws 11 and 12 can be driven to close gradually, like a clam, thereby clamping the dough pad filled with a filling to form a raw product of a dumpling or dumpling-like food product shaped in a "D" or semicircle.

In the embodiment as shown in FIG. 2-4, jaws 11 and 12 are preferably formed of flexible materials such as rubber or elastomer and connected to a transmission mechanism 20 through connectors, such as pins, bolts, pegs, etc, 40a and 40b. In the present embodiment, connectors 40a and 40b are illustratively pins each with an upper end thereof embedded in jaws 11 and 12 from beneath, such that the jaws are each attached to a swing member 22b (to be described later) of transmission mechanism 20. As a result, within a predetermined scope, each of mold jaws 11 and 12 is movable with swing member 22b in a plane defined by itself. The plane defined by a jaw is an imaginary plane in which the D-shape or semicircular outline of each jaw is formed. As shown in FIG. 3, the plane defined by jaw 11 is an imaginary plane in which the D-shape or semicircular outline of jaw 11 is formed; and the plane defined by jaw 12 is an imaginary plane in which the D-shape or semicircular outline of jaw 12 is formed. In a state where mold set 10 is flat open or completely closed, the plane defined by jaw 11 will overlap the one defined by jaw 12. That is to say, in this state, the pair of jaws 11 and 12 happens to form only on plane by themselves.

In the embodiment as shown in FIGS. 3-6, transmission mechanism 20, illustratively, is a four-bar linkage in which connectors 40a each penetrate a V-shape member 22 of the linkage with a lower end thereof further secured on one of the wing plates 34 laterally constituting the underpan 30. Upon application of a force from outside, the four-bar linkage will undergo a transformation, causing the V-shape member 22 each to pivotally rotate about a corresponding connector 40a. As a result, swing arm 22b of each V-shape member 22 functions to drive each of the jaws 11 and 12 into movement through the connections of connectors 40b. In the present embodiment, swing arm 22b of the V-shape member 22, each as a swing member of the transmission mechanism 20, applies to actuate jaws 11 and 12 in a state of being closed into the action of humanlike compression toward the filling pocket of a dumpling.

Referring to FIGS. 2-5, jaws 11 and 12 are further formed with recesses 13, e.g. in the forms of wedge-like notches or other types of grooves, on their respective surfaces that will contact the dough of a dumpling or a dumpling-like food product when the jaws am dosed. When the swing member 22b of transmission mechanism 20 swings inwardly within the plane defined by each jaw, the jaws tend to bend at their respective positions where recesses 13 are formed, thus forming flex points and an outer crease similar to those formed when human fingers are flexed. In a state of jaws 11 and 12 being closed, the flex points and crease will leave on the dough of a dumpling or a dumpling-like food product an impression similar to that left by real human fingers, thereby achieving the appearance of a handmade product, which is more satiable to people's aesthetic preference for traditional handmade dumplings.

It is preferable if jaws 11 and 12 each have increased resilience therein so they can reliably return to a home position corresponding to their original uncompressed state following each compression. To help accomplish that purpose, a spring 14 can be provided in each of the jaws. In the embodiment as shown in FIG. 4, spring 14, illustratively, is a twisted metal embedded in each of the jaws. It is readily understood that springs in other forms such as a metal bar, a coil spring or a plate spring can also be used instead. To fully stretch its resilience, spring 14 can be configured to go through each end of pins 40a and 40b, such that the elasticity of spring 14 will apply, through pins 40a and 40b, on the four-bar linkage 20 directly. Through such structure, life of jaws 11 and 12 each in flexible material will be well elongated. Alternatively, spring 14 can be placed somewhere outside the jaws, e.g. in a member directly connected to the jaws, such as in the four-bar linkage 20. That solution will be described later.

In the embodiment as shown in FIG. 4, four-bar linkage 20 is illustratively a rod-hinged mechanism composed by two linear arms 21 and two V-shape members 22, wherein the two linear arms 21 are end-hinged in a "V" shape by a pivot on which a cam roller 23 is mounted and the other end of each linear arm 21 is further hinged with a side arm 22a of each V-shape member 22. Connected this way, the two linear arms 21 and the two side arms 22a of V-shape members 22 are constructed to form a quasi-parallelogram mechanism.

It has been described hereinbefore that swing am 22b of each V-shape member 22, as a swing member of each four-bar linkage 20, functions to act on the jaws 11 and 12 through the connections of connectors 40a and 40b. As shown in FIGS. 4-6, each connector 40a runs through the vertex of one V-shape member 22, than to be secured on one of the wing plates 34, such that each V-shape member 22 is pivotally rotatable about a corresponding connector 40a. In such structure, four-bar linkage 20 may transmit power through parallelogram transformation, thereby driving the pair of jaws 11 and 12 into the action of compressing the filling pocket of a dumpling or a dumpling-like food product as a human worker does. More particularly, if a force is applied on four-bar linkage 20 through cam roller 23, the linkage 20 will be forced to transform, thereby actuating swing arms 22b into swing actions within a predetermined scope in the plane defined by the jaws. In a state of jaws 11 and 12 being closed, if four-bar linkage 20 is compressed to be "dumpy", swing members 22b will pivot about each connector 40a and swing inwardly to the interior of mold set 10, causing the jaws 11 and 12 in a closed state to contract inwardly like a "Ω" or "C" within the plane defined by themselves. Dumplings compressed this way tend to be like a scallop.

To imitate another form of human compression, connectors 40a each may be positioned away from the vertex of each V-shape member 22 by a distance and relocated somewhere along the side arm 22a. In this case, additional connectors 40b need to be pegged at the same positions where pins 40a each have been moved out, such that portions on each of the jaws corresponding to the vertex of a V-shape member 22 will still remain attached to the same places on V-shape member 22 after connectors 40a each have been repositioned. Constructed this way, a whole swing arm 22b as well as a part of side arm 22a of each V-shape member 22, totally as one swing member, is allowed to take part in the swing action for actuating jaws 11 and 12 into movements. If actuated in this manner, jaws 11 and 12 in a closed state will contract to form a substantially curved "V" shape. Dumplings or dumpling-like food products compressed in this manner tend to be shaped in a curved triangle.

Moreover, side arm 22b of each V-shape member 22 may be shaped to correspond more to the shape of the jaws, e.g. from linear, as shown in FIG. 3, to be arcuate (not shown). This change is intended to adjust the angular direction in which the jaws each are driven to compress the filling pocket of a dumpling or dumpling-like food product in order to improve the effect and thus the appearance achieved by the compression.

More recesses 13 may be formed on jaws 11 and 12, in addition to those already shown in FIGS. 3 and 5, to simulate more of the flex points and crease of real human fingers so that the final appearance of a dumpling or dumpling-like food product can be more vividly like that of a real handmade product. Still, it is possible that the recesses on each of the jaws are configured to be staggered with respect to one other. That is, in a state of being closed, recesses between each pair of jaws do not overlap with each other, resulting in an alternating impression being formed on the dumpling or dumpling-like food product similar to that left by staggered finger joints on a real handmade product.

As mentioned above, spring 14 may be provided in the four-bar linkage 20 to help return each jaw to the home position corresponding to its originally uncompressed state. As an example (not shown), spring 14 can be a coil spring configured to connect two opposing hinge pins 24 (as shown in FIG. 4) within each four-bar linkage 20. Urged by the force to transform the four-bar linkage 20, spring 14 will be either drawn or compressed to store energy therein. As the force obliging the transformation fades till finally disappeared, spring 14 will concurrently release the energy, thereby counter-driving the respective jaw in connection with the four-bar linkage 20 back into its home position. Apparently, spring 14, if provided in the four-bar linkage 20, helps to simplify the structure of the jaw as well as assures the home reversion of the jaw following each contraction thereof.

Figure 1:
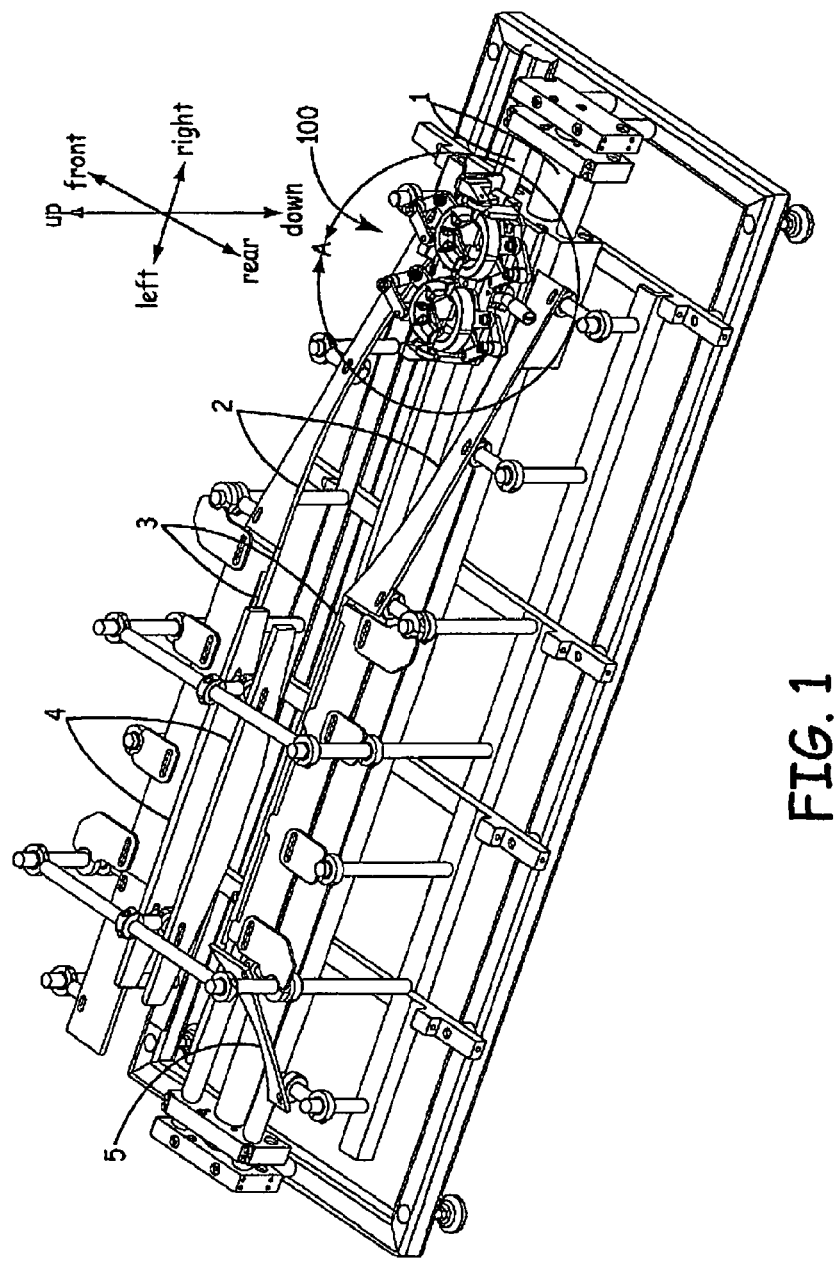
FIG. 1 is a diagram illustratively showing a whole system of the forming pallet and the various guide rails of the present invention.

In the embodiment as described above, four-bar linkage 20 is transformed to drive each of the jaws based on a rail-guided transmission cooperatively formed between the cam roller 23 and a press rail 4 (as shown in FIG. 1, and to be described later). Obviously, any other form of drive mechanisms, e.g. a planar linkage mechanism (esp. a parallelogram linkage), a crank linkage mechanism, a hybrid linkage mechanism, or even a fluid (hydraulic or pneumatic) pressure device can be used as a compressive device to drive the mold set of the present invention, as long as such device can drive the jaws in state of being closed in a way which simulates the human action of compressing the filling pocket inwardly from the crest of a dumpling or dumpling-like food product within the plane defined by the jaws.

In the case where the fluid pressure device is used, fluid in pressure in the device applies to drive the jaws. For example, a fluid chamber or cell may be provided within at least a portion of each jaw. In a state of jaws 11 and 12 being closed, the chamber or cell, if inflated with a fluid of increasing pressure, will bulge inwardly to contact the dough of a dumpling thereby simulating the human action of compressing the filling pocket inwardly from the crest of the dumpling or dumpling-like food product. If the pressure is released, the chamber or cell will be deflated to contract thereby finishing the compression. It should be noted that, even in the case of a fluid pressure device being used as described above, materials of the jaws are not necessarily flexible as a whole, as long as the chamber or cell therein is able to bulge and contract all by itself. It is understandable that, in order to drive the jaws into the human action of compressing the filling pocket, any means or devices in the prior art can be used appropriately without limit to the preferred embodiments as described above.

As shown in FIGS. 5 and 6, besides the two wing plates 34 each having a cam roller 34a thereon, underpan 30 further includes pivot discs 31, pivot brackets 32, spacers 33 and saucers 35. The two pivot discs 31 right oppose each other so as to define a hinge axis imagined to connect each of their centers as shown in FIGS. 3-6, about which the pair of wing plates 34 may close and open coaxially with the pair of jaws 11 and 12. In more detail, pivot brackets 32 integrally formed with each wing plate 34 are only rotatable about the annular rail formed by a peripheral flange 31a of each pivot disc 31, in which case the pair of wing plates 34 mare guided to close and open coaxially with the pair of jaws 11 and 12 in the same way as a butterfly flutters its wings. Spacers 33 will abut pivot brackets 32 when wing plates 34 each hang down, in which case a lowest position of each wing plate 34 is thereby defined by spacers 33. When the wing plates 34 each rest on the lowest position, jaws 11 and 12 lie flat open. Saucers 35, firmly fixed on underpan 30, each go up to the center of a mold set 10 wherein, as a part of the mold act, each of them cooperate with jaws 11 and 12 to collectively support a dough pad to be placed thereon as well as the filling later to be disposed on the pad.

As shown in FIG. 2, underpan 30 is further mounted on base frame 50 which is configured to carry, in a controllable manner, the whole forming pallet 100 along pallet rails 1 in a predetermined direction or through different positions corresponding to the sequential steps in the whole forming process. In the embodiment as shown in FIG. 1, pallet rails 1 provide a linear path along which forming pallet 100 is accurately controlled and positioned by means of pressure fluid devices such as a rod-less pneumatic (or hydraulic) cylinder, or conventional driving mechanisms such as a servo motor, timing belts or chains, etc. In the prior art, however, pallet rails 1 are often in the four of a rotary rail around which forming pallet 100 is guided by means of a gearbox driven by a central rotating motor.

The forming progress will be further described as below with reference to the mold set and the compressive device shown in FIG. 1.

Both wing plates 34 of underpan 30 hang down at the pull of gravity thereby resting at the lowest position thereof decided by spacer 33 when forming pallet 100 is positioned at a starting position corresponding to the right end of pallet rails 1 as shown in FIG. 1. At this position, jaws 11 and 12 lie flat so that mold set 10 is open like a disk. As described above, jaws 11 and 12, when flat open, are collectively used with saucer 35 to support a dough pad and a filling later to be deposited on the pad. In the ca where a rotary rail 1 is used as in the prior art, forming pallet 100 is first positioned somewhere corresponding to the starting position to receive the dough pad and then driven ahead along rail 1 to the next position where the filling will be deposited on the center of the dough pad.

Referring to FIG. 1, with forming pallet 100 driven ahead in a predetermined direction (from right to left) along pallet rails 1, cam rollers 34a each will be guided by a 3-dimensional curve defined by fold rails 2, thereby lifting from both sides the wing plates 34 supporting the four-bar linkages 20 and the jaws 11 and 12 thereon accordingly. Subsequently, jaws 11 and 12 will completely close like a clam before fold rails 2 are connectively switched to pinch rails 3. For both of the cam rollers 34a, pinch rails 3 have define a path along which jaws 11 and 12 in a state of being closed are force to pinch the crest hard enough for the filling then sealed in the pocket of a dumpling or dumpling-like food product not to escape in any later compression that follows.

Not long after cam rollers 34a enter into pinch rails 3, cam rollers 23 then already heaved upwardly will come into contact with press rails 4, respectively. As shown in FIG. 1, press rails 4 are a pair of rails formed in the same profile and disposed in parallel to each other. In the predetermined direction in which forming pallet 100 is driven ahead, press rails 4 each, in a first halfway part thereof, have a downwardly curved or descending lower edge configured to guide and urge each of the cam rollers 23 to gradually transform the respective four-bar linkage 20. The rail-guided transmission cooperatively farmed between press rails 4 and cam rollers 23 is transformed through each four-bar linkage 20, which is finally translated to be the swing action of swing members 22b driving the jaws 11 and 12 in a closed state to simulate the human action of compressing the filling pocket of a dumpling or dumpling-like food product inwardly from the crest thereof within the plane defined by the jaws.

With cam rollers 23 passing under the lowermost edge point of each press rail 4, the next halfway profile of each press rail 4 defines by its lower edge a gradually ascending path. However, not long after cam rollers 23 enter into the ascending path of each press rail 4, cam roller 34a on one of the wing plates 34 takes the lead switching from its corresponding pinch rail 3 to a release rail 5. Meanwhile, the other wing plate 34 may still remain erected through the contact of its cam roller 34a with the pinch rail 3 on the other side. Upon the pull of gravity, the diverged wing plate 34 will slide down along release rail 5 thereby to lie flat on the lowest position thereof. In the state where the mold set 10 is only laterally open, a pushing rod (not shown) may be used to remove the final product of a dumpling or dumpling-like food product from mold set 10 to a conveyance belt nearby, thereby finishing the whole process simulating the manual action for forming handmade products based on a dumpling forming machine.

After one of the cam rollers 34a has entered into the release rail 5 while the other into the ascending path of the one corresponding press rail 4, jaws 11 and 12 of flexible materials may, upon self resiliency (and preferably aided by spring 14), return from a compressive position corresponding to an innermost act of compression to the home position corresponding to the blank margin of a dough pad. Thereafter, forming pallet 100 may return all the same way (from left to right) to the starting position as shown in FIG. 1, where a new cycle of the framing process may repeat. In the case where a rotary rail is adopted a in the prior art, an and position where forming pallet 100 finally reaches is actually the same position as the starting position, because the pallet, after all the forming progress, has just finished a round journey when finally returning to the starting position. At the starting position, the farming progress may repeat in a new cycle.

In the above embodiments, jaws 11 and 12 are described to be integrally formed of flexible materials. However, it is also possible that non-flexible materials apply to achieve a fully satisfying effect as well. For example, only the exterior of jaws 11 and 12 are made from flexible mold set materials, while the interior thereof each contains a linkage of rigid members such as pivot joints and connecting rods between the pivot joints. In this case, connectors 40a and 40b still apply to connect the pivot joints or the connecting rods, thereby mounting jaws 11 and 12 on the four-bar linkage 20 and on the underpan 30. Obviously, four-bar linkages or other forms of transmission mechanisms still function the same way as described above in driving the jaws in a closed state to simulate the human action in compressing the filling pocket of a dumpling or dumpling-like food product within the plane defined by the jaws.

In the case where a non-flexible material is used, jaws 11 and 12 themselves, for lack of enough resilience, might not spring back from the compressive position to the home position after each compression of the dumpling filling pocket. For that, a solution is provided, as described above, in which spring 14 is configured to connect two opposing hinge pins 24 in each of the four-bar linkages 20, such that jaws 11 and 12 each can be driven back to their home position following each compression.

As another choice, the present press rails 4 may be modified to further include sub rails 4a and sub rails 4b (not shown), respectively. Sub rails 4a, in the traveling direction of forming pallet 100, each have a downwardly curved are descending lower edge configured to urge the pair of jaws in a state of being closed to simulate the human action of compressing the dumpling filling pocket in the plane defined by the jaws, thus to be called herein as "press sub rails". Sub rails 4b, disposed at a downstream side of press sub rails 4a in the traveling direction of forming pallet 100, each have an upwardly curved or ascending upper edge configured to counter-drive the pair of jaws from the compressive position back to the home position, thus to be called herein as "return sub rails". As such, as long as cam rollers 23 are configured to travel from press sub rails 4a to return sub rails 4b sequentially, jaws 11 and 12 each may be driven and reciprocate between the compressive position and the home position, irrespective of the resilience of any flexible material and/or spring member to be adopted.

From the above description, it can be seen that, even in the case of the mold set and its compressive device having no resilience at all, a bidirectional compressive device comprising a transmission mechanism and bidirectional press rails (sub rails 4a and 4b), as described above, can be used to drive the pair of the jaws inwardly, to simulate the human action of compressing the dumpling filling pocket, and outwardly, to return the jaws from the compressive position to the home position. Of course, as still another choice, the bidirectional compressive device may be a fluid pressure device having a fluid chamber or cell therein as described in paragraph [0032], which won't be repeated here any more.

As is also obvious, the bidirectional compressive device including the sub press rails 4a and sub return 4b will still apply even if the jaws 11 and 12 are flexible, which won't be discussed here anymore for the sake of redundancy.

What is claimed is:

1. A mold device used for dumpling or dumpling-like food product formation comprising:
    a pair of jaws, wherein the pair of jaws is configured to close to clamp a dough pad over a filling thereby forming a raw product of the dumpling or dumpling-like food product; and
    a transmission mechanism connected to the pair of jaws through connectors embedded in the pair of jaws from beneath,
    wherein the transmission mechanism is configured to be driven, after closing the pair of jaws to clamp the dough pad over the filling, to drive each of the pair of jaws into movement through the connectors such that the filling pocket is compressed from a crest of the filling pocket inwardly to simulate the human action of compressing the filling pocket of the dumpling or dumpling-like food product.

2. The mold device according to claim 1, wherein each of the jaws is formed from flexible materials.

3. The mold device according to claim 2, wherein a first spring is placed inside or outside of each of the jaws to provide increased resilience.

4. The mold device according to claim 2, wherein the jaws are further formed with recesses on their respective surface that will contact the dumpling or the dumpling-like food product when the jaws are closed, thereby simulating the flex points and outer crease left on a handmade dumpling or dumpling-like food product by real human fingers.

5. The mold device according to claim 1, wherein the transmission mechanism further comprises a cam roller configured to be guided along a press rail so as to drive the pair of jaws in the closed condition.

6. The mold device according to claim 1, wherein the transmission mechanism is a four-bar linkage configured to transmit power by means of parallelogram transformation for driving the pair of jaws in a closed condition to simulate the human action of compressing a filling pocket of the dumpling or dumpling-like food product.

7. The mold device according to claim 6, wherein the four-bar linkage is further provided with a spring such that when a force obliging the transformation of the four-bar linkage fades till finally disappeared, the spring will concurrently release a power once stored therein, thereby driving the pair of jaws in connection with the four-bar linkage back into their home positions.

8. The mold device according to claim 5,
    wherein the press rail comprises a press sub rail and a return sub rail sequentially arranged in a predetermined direction in which the transmission mechanism is driven ahead;
    wherein the transmission mechanism is configured to drive the pair of jaws in the closed condition to simulate the human action of compressing the filling pocket of a dumpling or dumpling-like food product as the cam roller is guided along the press sub rail; and
    wherein the transmission mechanism is configured to counter-drive the jaws to return to their home positions as the cam roller is guided along the return sub rail.

9. The mold device according to claim 5, wherein the press rail is either linear or rotary.

10. A food product forming machine comprising:
    a mold set comprising a pair of jaws, wherein the pair of jaws is configured to close to clamp a dough pad over a filling thereby forming a raw product of the dumpling or dumpling-like food product, and wherein the jaws in a closed condition can be driven to simulate the human action of compressing the filling pocket of a dumpling or dumpling-like food product;
    a transmission mechanism connected to the pair of jaws through connectors embedded in the pair of jaws from beneath, the transmission mechanism being configured to drive the pair of jaws in the closed condition to simulate the human action of compressing the filling pocket of a dumpling or dumpling-like food product when the transmission mechanism is driven ahead together with the mold set in a predetermined direction;
    a pair of wing plates corresponding to the pair of the jaws, respectively, for driving the mold set to close and open, the wing plates each having thereon a mold set open-and-close drive roller configured to form rail-guided engagement with a pair of fold rails and at least one release rail which are arranged in the dumpling or dumpling-like food product forming machine, respectively; and
    a base frame for conveying the mold set, transmission mechanism and the pair of wing plates in the predetermined direction;
    wherein, when the base frame advances in the predetermined direction, each mold set open-and-close drive roller rolls on its respective fold rail, such that the pair of jaws of the mold set will close in a closing act of the pair of wing plates; and
    wherein, when the base frame further advances in the predetermined direction, at least one of the mold set open-and-close drive rollers rolls on the at least one release rail, such that the pair of jaws of the mold set will open in an opening act of the pair of wing plates.

11. A dumpling or dumpling-like food product forming machine comprising:
    a mold set comprising a pair of jaws, wherein the pair of jaws is configured to close a dough pad over a filling thereby forming a raw product of the dumpling or dumpling-like food product, and wherein the jaws in a closed condition can be driven to simulate the human action of compressing the filling pocket of a dumpling or dumpling-like food product;
    a transmission mechanism connected to the pair of jaws through connectors embedded in the pair of jaws from beneath, the transmission mechanism being configured to drive the pair of jaws in the closed condition to simulate the human action of compressing the filling pocket of a dumpling or dumpling-like food product when the transmission mechanism is driven ahead together with the mold set in a predetermined direction;

a mold set open-and-close drive means comprising a pair of fold rails, a release rail, and a pair of wing plates corresponding to the pair of the jaws, respectively, for driving the mold set to close and open, the wing plates each having thereon a mold set open-and-close drive roller configured to form rail-guided engagement with the fold rails and the release rail, respectively; and a base frame for conveying the mold set, transmission mechanism and the pair of wing plates in the predetermined direction;

wherein, when the base frame advances in the predetermined direction, each mold set open-and-close drive roller rolls on its respective fold rail, such that the pair of jaws of the mold set will close in a closing act of the pair of wing plates;

wherein, when the base frame further advances in the predetermined direction, at least one of the mold set open-and-close drive rollers rolls on the release rail, such that the pair of jaws of the mold set will open in an opening act of the pair of wing plates; and wherein the press rail is interposed between the fold rails and the release rail in the predetermined direction.

* * * * *